United States Patent [19]

Asami et al.

[11] 4,148,979

[45] Apr. 10, 1979

[54] METHOD OF IMPROVING CHARACTERISTICS OF CATION-EXCHANGE MEMBRANE BY SWELLING IN WATER MISCIBLE ORGANIC SOLVENT

[75] Inventors: Shunichi Asami; Toru Seita; Akihiko Shimizu, all of Shin-nanyo, Japan

[73] Assignee: Toyo Soda Manufacturing Co., Ltd., Yamaguchi, Japan

[21] Appl. No.: 790,818

[22] Filed: Apr. 25, 1977

[30] Foreign Application Priority Data

Apr. 27, 1976 [JP] Japan ................................. 51-47233
May 26, 1976 [JP] Japan ................................. 51-60156
Dec. 7, 1976 [JP] Japan ................................. 51-146160

[51] Int. Cl.$^2$ ..................... B01D 15/04; C08F 14/18; C08J 5/22
[52] U.S. Cl. ............................................................ 521/27
[58] Field of Search ...................... 526/494, 495, 496; 260/2.1 R, 2.2 R, 2.1 E; 521/27

[56] References Cited

U.S. PATENT DOCUMENTS

| | | | |
|---|---|---|---|
| 3,257,334 | 6/1966 | Chen et al. ........................ | 260/884 |
| 3,413,276 | 11/1968 | Haashi et al. ........................ | 528/494 |
| 3,684,747 | 8/1972 | Coalson et al. .................... | 260/2.2 R |
| 3,969,285 | 7/1976 | Grot ................................. | 260/2.2 R |

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

A homogeneous cation-exchange membrane made of one or more fluorinated polymer having cation-exchangeable groups is swollen with a water miscible organic solvent and then the solvent is removed from the swollen membrane.

The fluorinated polymer having cation-exchangeable groups has special characteristics to the water-miscible organic solvent because the cation-exchangeable groups have high affinity to the water-miscible organic solvent though the base of the fluorinated polymer may have water-and oil-repellent properties, whereby the cation-exchange membrane of the fluorinated polymer having cation-exchangeable groups is modified to reduce the permeability of hydroxyl group ions by swelling it and removing the water-miscible organic solvent.

10 Claims, No Drawings

METHOD OF IMPROVING CHARACTERISTICS OF CATION-EXCHANGE MEMBRANE BY SWELLING IN WATER MISCIBLE ORGANIC SOLVENT

BACKGROUND OF THE INVENTION

The present invention relates to a method of improving current efficiency of a cation-exchange membrane. More particularly, it relates to a method of improving current efficiency in an electrodialysis of an electrolyte by a cation-exchange membrane in an aqueous solution having hydroxyl group ions which comprises swelling a homogeneous cation-exchange membrane with a water-miscible organic solvent to reduce the permeability of hydroxyl group ions.

In general, cation-exchange memmbranes have high resistance to permeation of anions. However, they have relatively high permeability only to hydroxyl group ions in comparison with the other anions. This fact is well-known and is considered to be caused by high mobility of hydroxyl group ion in an aqueous solution in comparison with the other anions.

The phenomenon that the cation-exchange membranes have relatively high permeability to hydroxyl group ions, is sometimes effective, for example, to separate an alkali metal hydroxide by a diffusion dialysis using a cation-exchange membrane from an aqueous solution containing electrolytes of alkali metal hydroxide and a salt thereof.

However, on the other hand, the phenomenon is disadvantageous to reduce current efficiency by diffusion-permeation of hydroxyl group ions through the cation-exchange membrane in the electrical operation for separation or concentration of an aqueous solution of electrolytes containing hydroxyl group ions by a cation-exchange membrane. Accordingly, it is desired to use a cation-exchange membrane having low permeability of hydroxyl group ions for the purpose.

SUMMARY OF THE INVENTION

It is an object of the present invention to provide a method of improving current efficiency in an electrical separation or concentration by using a homogeneous cation-exchange membrane under reducing permeability of hydroxyl group ions without deteriorating the other characteristics of the membrane.

The foregoing and other objects of the present inventions have been attained by swelling a homogeneous cation-exchange membrane of a fluorinated polymer with a water-miscible organic solvent and then removing the solvent from the membrane by a specific manner.

DETAILED DESCRIPTION OF THE PREFERRED EMBODIMENTS

The method of the present invention can be effectively applied for treating a cation-exchange membrane used as a diaphragm in an electrolysis of sodium chloride. For example, in the production of sodium hydroxide in a diaphragm type electrolytic cell using a cation-exchange membrane by electrolyzing under feeding an aqueous solution of sodium chloride into the anode comaprtment to obtain 20 wt. % aqueous solution of sodium hydroxide, it is possible to improve 5 to 10% of current efficiency based on sodium hydroxide in comparison with that using the non-treated cation-exchange membrane.

The application of the invention is not limited to this case but it can be the application by treating the cation-exchange membrane in various fields in which high permeability of hydroxyl group ions to the cation-exchange membrane is not desired such as a concentration of alkali metal hydroxide by an electrodialysis and a production of sodium hydroxide and sulfuric acid by an electrolysis of sodium sulfate, etc.

The cation-exchangeable groups in the cation-exchange membrane can be acid type or salt type depending upon the condition using the cation-exchange membrane.

The method of the invention is effective for both types. When the cation-exchangeable groups are in the salt type, the effect is especially higher than that of the acid type.

The fact shows that the method of the invention is not only effective for improving current efficiency of a new cation-exchange membrane but also is effective for recovering a cation-exchange membrane having low current efficiency used in a aqueous solution of electrolytes for a long period to improve the characteristics of the membrane to the original characteristics or higher.

The effect of the invention by treating the salt type cation-exchange membrane is also one of the important feature of the invention.

The cation-exchange membrane used as a diaphragm for an electrolysis of sodium chloride is expensive and the cost of the membrane is at high ratio of the cost for producing sodium hydroxide by a cation-exchange membrane method.

In accordance with the treatment of the invention, the cation-exchange membrane can be repeatedly used in economical advantages.

The method of the invention is simple. The cation-exchange membrane is dipped into a water miscible solvent to swell the membrane with the solvent and then the solvent is removed from the membrane.

The dipping time is dependent upon the swelling property of the membrane to the water miscible solvent and it is preferably longer. When the swelling property by the water miscible solvent is high, the dipping time can be several tens minutes and the solvent can be heated for promoting the swelling property.

The swelling degree of the cation-exchange membrane by the water miscible solvent can be about 3%, but is preferably more than 5% as the percent of a weight gain of the membrane by swelling to a non-treated dry membrane.

The water miscible solvent immersed in the membrane in the swelling step is removed by drying under an atmospheric pressure or a reduced pressure.

In the optimum method, the cation-exchange membrane immersed with the water miscible solution is held between two plates and is heated to remove the water miscible solution whereby the swelling and removing steps are combined without deforming the shape of the cation-exchange membrane. The temperature is lower than the temperature of softening the cation-exchange membrane and the pressure between the plates can be held the cation-exchange membrane or higher.

Many methods of improving current efficiency on cation-exchange membranes in various uses by reducing permeability of hydroxyl group ions have been proposed. (Japanese Patent Publicaton No. 11603/1964 and Japanese Unexamined Patent Publication Nos. 66488/1975, 105581/1975, 108182/1975 and 120492/1975, etc.)

In these methods, the chemical structure of a part or whole of the membrane are modified or another polymer is combined or special ion-exchangeable groups are formed. They are substantially different from the method of the invention.

In these methods, it may be difficult to recover a membrane whose functional characteristic is deteriorated by the application. In accordance with the method of the present invention, the cation-exchange membrane can be easily recovered to the initial characteristic or higher.

The method of improving current efficiency by increasing the ion-selective permeability of the membrane by evaporating a part of water content in the ion-exchange membrane is proposed. (Japanese Patent Publication No. 4637/1975). The patent discloses that the diffusion coefficient of chlorine ions can be reduced by applying the method to the cation-exchange membrane. However, as shown in the following Reference to Example of the present invention, suitable effect for reducing permeability of hydroxyl group ions could not attained by removing water from the membrane by the evaporation.

In the method of the present invention, it is indispensable to swell the cation-exchange membrane with the water miscible organic solvent and the method of the invention is different from the method disclosed in Japanese Patent Publicaton No. 4637/1975.

With regard to a swelling treatment of an ion-exchange membrane with an organic solvent, the method of preventing the decrease of characteristics of the membrane caused by clogging such as the increase of electric resistance and the decrease of ion selective permeability is disclosed in Japanese Unexamined Patent Publication No. 158590/1975. The effect of the treatment is to easily remove relatively large molecules adhered on or immersed into the membrane by swelling the membrane with an organic solvent and this is a washing effect. The characteristics of the membrane are not improved over the initial characteristics by the treatment besides the permeability of ions of water.

In accordance with the method of the invention, the permeability of hydroxyl group ions on the cation-exchange membrane is reduced in comparison with the initial characteristics of the original membrane. Accordingly, the concept and effect of the present invention are clearly different from those of Japanese Unexamined Patent Publication No. 158590/1975.

In the method of the present invention, it is indispensable to swell the ion-exchangeable parts having the cation-exchangeable groups in the cation-exchange membrane with the water miscible organic solvent. The effect of the present invention is not effectively attained for the non-homogeneous cation-exchange membrane containing the electrical inactive bonding material or the net structure of polymer for preventing the loss of the ion-exchange material.

The effect of the present invention can be expected only for the homogeneous cation-exchange membranes.

The homogeneous cation-exchange membranes are different from the non-homogeneous cation-exchange membranes containing the bonding material or the other inactive polymer which has no cation-exchangeability in a micro-net structure. Thus, the homogeneous cation-exchange membrane can be reinforced with a fabric for increasing the mechanical strength of the membrane.

The cation-exchange groups of the fluorinated polymers used in the invention can be sulfonic acid group, carboxylic acid group or salts thereof.

The cation-exchange groups on or near the surface of the homogeneous cation-exchange membrane can be functional groups which can be converted to sulfonic acid groups or carboxylic acid groups.

The cation-exchange groups in a cation-exchange membrane can be destroyed by means of a chemical treatment to form an electrically inactive surface layer.

Typical fluorinated polymers having cation-exchangeable groups have the following units. The units may have groups which can be converted into cation-exchangeable groups.

A) Sulfonic acid type fluorinated polymers:

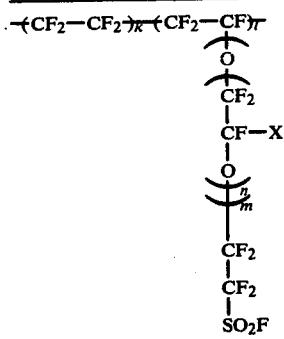

$X = CF_3, -CF_2-O-CF_3;$
$n = 0$ or 1 to 5;
$m = 0$ or 1;
$k/l = 3-16$ preferably 5-13.

such as;

(1) 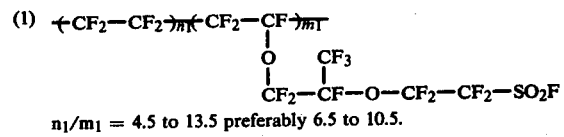

$n_1/m_1 = 4.5$ to 13.5 preferably 6.5 to 10.5.

(2) 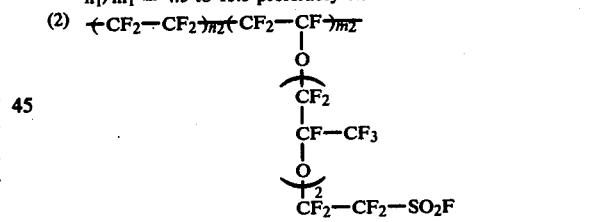

$n_2/m_2 = 3$ to 12 preferably 5 to 9.

(3) 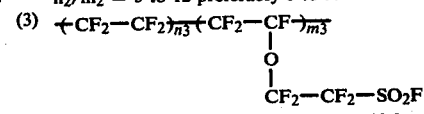

$n_3/m_3 = 6.2$ to 15.2 preferably 8.2 to 12.2.

(4) 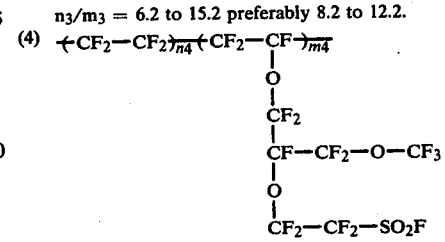

$n_4/m_4 = 3.9$ to 12.9 preferably 5.9 to 9.9.

(5) 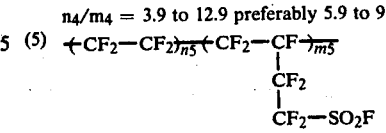

$n_5/m_5 = 6.4$ to $15.4$ preferably $8.4$ to $12.4$.

(B)
Carboxylic acid type fluorinated polymers;

$$-(CF_2-CF_2)_p-(CF_2-CF)_q-(CF_2-CF)_r-$$
$$\phantom{xxxxxxxxx} | \phantom{xxxxxx} |$$
$$\phantom{xxxxxxxxx} O \phantom{xxxxx} R$$
$$\phantom{xxxxxxxxx} | $$
$$\phantom{xxxxxxxxx} CF_3$$

R represents
A,
$-O-(CF_2)_a-A$,
$-O-(CF_2-CF-O)_b-CF_2-CF_2-A$
$\phantom{xxxxxxx}|$
$\phantom{xxxxxx}CF_3$
$-(CF_2)_c-A$.
$a = 2$ to $4$;
$b = 0$ or $1$ to $5$;
$c = 1$ to $5$;
$A = -COF, -COOCH_3$;
$(p+q)/r = 0.5-19$ preferably $1-10$.

such as;

(1)
$$-(CF_2-CF_2)_{p1}-(CF_2-CF)_{q1}-$$
$$\phantom{xxxxxxxx}O$$
$$\phantom{xxxxxxxx}|$$
$$\phantom{xxxxxxxx}CF_2$$
$$\phantom{xxxxxxxx}|$$
$$\phantom{xxxxxxxx}CF_2$$
$$\phantom{xxxxxxxx}|$$
$$\phantom{xxxxxxx}CF_2-COF$$

$p_1/q_1 = 17.1$ to $2.1$ preferably $8.2$ to $2.6$.

(2)
$$-(CF_2-CF_2)_{p2}-(CF_2-CF)_{q2}-$$
$$\phantom{xxxxxxxxxx}O$$
$$\phantom{xxxxxxxxxx}|$$
$$\phantom{xxxxxxxxx}CF_2-CF_2-CF_2-CF_2-COOCH_3$$

$p_2/q_2 = 16.4$ to $1.4$ preferably $7.6$ to $2.0$.

(3)
$$-(CF_2-CF_2)_{p3}-(CF_2-CF)_{q3}-$$
$$\phantom{xxxxxxxxx}O$$
$$\phantom{xxxxxxxxx}|$$
$$\phantom{xxxxxxxx}CF_2-CF_2-COF$$

$p_3/q_3 = 17.6$ to $2.6$ preferably $8.7$ to $3.1$.

(4)
$$-(CF_2-CF_2)_{p4}-(CF_2-CF)_{q4}-$$
$$\phantom{xxxxxxxx}O$$
$$\phantom{xxxxxxxx}|$$
$$\phantom{xxxxxx}CF_2-CF-O-CF_2-CF_2-COF$$
$$\phantom{xxxxxxxxxx}|$$
$$\phantom{xxxxxxxxx}CF_3$$

$p_4/q_4 = 15.8$ to $0.9$ preferably $7$ to $1.5$.

(5)
$$-(CF_2-CF_2)_{p5}-(CF_2-CF)_{q5}-$$
$$\phantom{xxxxxxxxx}COOCH_3$$

$p_5/q_5 = 18.6$ to $3.6$ preferably $9.7$ to $4.2$.

(6)
$$-(CF_2-CF_2)_{k1}-(CF_2-CF)_{l1}-(CF_2-CF)_{r1}-$$
$$\phantom{xxxxxxxx}O \phantom{xxxxxxxx} O$$
$$\phantom{xxxxxxxx}| \phantom{xxxxxxxxx} |$$
$$\phantom{xxxxxxx}CF_3 \phantom{xxxxx} CF_2-CF_2-CF_2-COF$$

$(k_1 + l_1)/r_1 = 17.1$ to $1.2$ preferably $8.2$ to $1.6$.

(7)
$$-(CF_2-CF_2)_{k2}-(CF_2-CF)_{l2}-(CF_2-CF)_{r2}-$$
$$\phantom{xxxxxxxx}O \phantom{xxxxxxxx} O$$
$$\phantom{xxxxxxxx}| \phantom{xxxxxxxxx} |$$
$$\phantom{xxxxxxx}CF_3 \phantom{xxxxxxx} (CF_2)_4$$
$$\phantom{xxxxxxxxxxxxxxxxxxx} |$$
$$\phantom{xxxxxxxxxxxxxxxx} COOCH_3$$

$(k_2 + l_2)/r_2 = 16.4$ to $0.9$ preferably $7.6$ to $1.2$.

(8)
$$-(CF_2-CF_2)_{k3}-(CF_2-CF)_{l3}-(CF_2-CF)_{r3}-$$
$$\phantom{xxxxxxxx}O \phantom{xxxxxxxx} O$$
$$\phantom{xxxxxxxx}| \phantom{xxxxxxxxx} |$$
$$\phantom{xxxxxxx}CF_3 \phantom{xxxxx} CF_2-CF_2-COF$$

$(k_3 + l_3)/r_3 = 17.6$ to $1.6$ preferably $8.7$ to $1.9$.

(9)
$$-(CF_2-CF_2)_{k4}-(CF_2-CF)_{l4}-(CF_2-CF)_{r4}-$$
$$\phantom{xxxxxxxx}O \phantom{xxxxxxxx} O$$
$$\phantom{xxxxxxxx}| \phantom{xxxxxxxxx} |$$
$$\phantom{xxxxxxx}CF_3 \phantom{xxxxxxx} CF_2$$
$$\phantom{xxxxxxxxxxxxxxx} F_3C-CF$$
$$\phantom{xxxxxxxxxxxxxxxxxxx} |$$
$$\phantom{xxxxxxxxxxxxxxxxxx} O-CF_2-CF_2-COF$$

$(k_4 + l_4)/r_4 = 15.8$ to $0.5$ preferably $7$ to $0.9$.

(10)
$$-(CF_2-CF_2)_{k5}-(CF_2-CF)_{l5}-(CF_2-CF)_{r5}-$$
$$\phantom{xxxxxxxx}O \phantom{xxxxxxxxx} COOCH_3$$
$$\phantom{xxxxxxxx}|$$
$$\phantom{xxxxxxx}CF_3$$

$(k_5 + l_5)/r_5 = 18.6$ to $2.1$ preferably $9.7$ to $2.5$.

C) Sulfonic acid and carboxylic acid type fluorinated polymers:

$$-(CF_2-CF_2)_d-(CF_2-CF)_e-(CF_2-CF)_f-(CF_2-CF)_g-$$
$$\phantom{xxxxxxxx}O \phantom{xxxxxxx} O \phantom{xxxxxxx} O$$
$$\phantom{xxxxxxxx}| \phantom{xxxxxxxx} | \phantom{xxxxxxxx} |$$
$$\phantom{xxxxxxx}CF_3 \phantom{xxxxxx} CF_2 \phantom{xxxxxx} R'$$
$$\phantom{xxxxxxxxxxxxxx} F_3C-CF$$
$$\phantom{xxxxxxxxxxxxxxxxxx} |$$
$$\phantom{xxxxxxxxxxxxxxx} O$$
$$\phantom{xxxxxxxxxxxxxxx} |$$
$$\phantom{xxxxxxxxxxxx} FO_2S-CF_2-CF_2$$

$R' = -CF_2-CF_2-CF_2-COF$,
$\phantom{xx} -CF_2-CF-O-CF_2-CF_2-COF$
$\phantom{xxxxxxx} |$
$\phantom{xxxxxx} CF_3$ $(d+e)/f = 0.5-17$ preferably $1-13$;
$(d+e)/g = 0.3-14$ preferably $0.8-8$;
$f/g = 0.2-2.2$ preferably $0.25-1.8$.

such as;
(1)

(1)

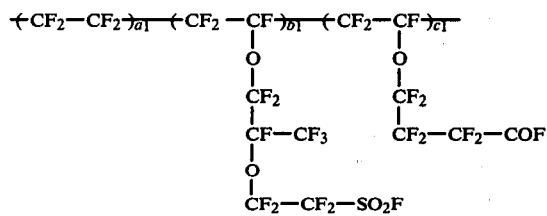

$a_1/b_1$ = 16.9 to 0.8 preferably 13.0 to 3.7
$a_1/c_1$ = 13.5 to 0.4 preferably 5.0 to 2.0
$b_1/c_1$ = 2.2 to 0.2 preferably 1.8 to 0.25.

(2)

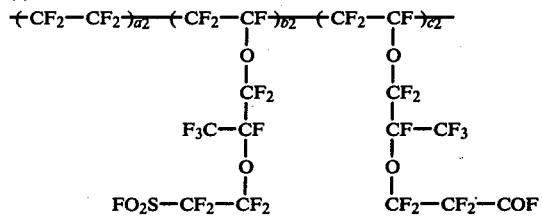

$a_2/b_2$ = 15.3 to 0.8 preferably 10 to 1.6
$a_2/c_2$ = 12.3 to 0.4 preferably 8.0 to 1.0
$b_2/c_2$ = 2.2 to 0.2 preferably 1.8 to 0.25.

(3)

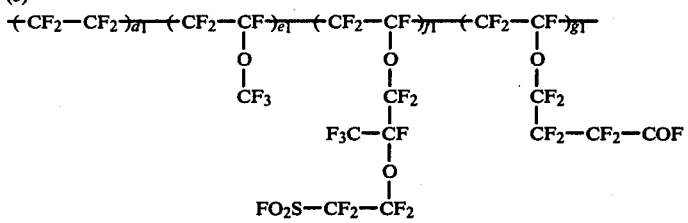

$(d_1 + e_1)/f_1$ = 16.9 to 0.5 preferably 13.0 to 1.80
$(d_1 + e_1)/g_1$ = 13.5 to 0.3 preferably 5.0 to 1.3
$f_1/g_1$ = 2.2 to 0.2 preferably 1.8 to 25.

(4)

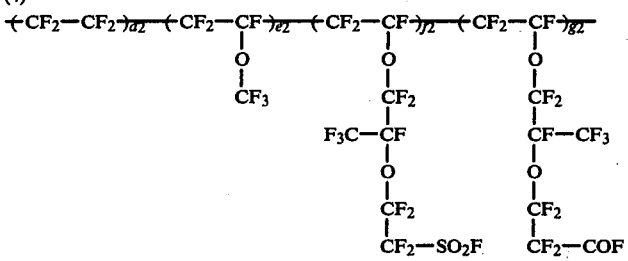

$(d_2 + e_2)/f_2$ = 15.3 to 0.5 preferably 9.2 to 1.0
$(d_2 + e_2)/g_2$ = 12.3 to 0.6 preferably 8.0 to 0.8
$f_2/g_2$ = 2.2 to 0.2 preferably 1.8 to 0.25.

In the units, —SO$_2$F and —COF and —COOCH$_3$ are converted to —SO$_3$H, —COOH after forming the membrane. These examples of the units for the fluorinated polymers having cation-exchangeable groups are only schematic illustrations and the combinations of the units can be decided by the copolymerizations of the monomers.

The typical monomers are as follows:

Monomers having a cation-exchangeable group or a functional group which can be converted to cation-exchangeable group.

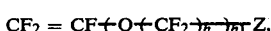
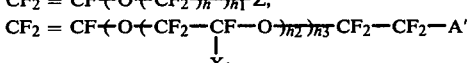
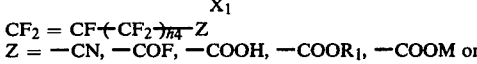

Z = —CN, —COF, —COOH, —COOR$_1$, —COOM or —CONR$_2$R$_3$

R$_1$ = C$_1$—C$_{10}$ alkyl group;
R$_2$, R$_3$ = H, or R$_1$;
M = alkali metal;
A' = —SO$_2$X', —COX';
X' = F or —OY;
Y = H, M, NH$_4$, or R$_1$;
X$_1$ = F, —CF$_3$ or —CF$_2$—O—CF$_3$.
h = 2 to 12;
h$_1$, h$_3$ = 0 or 1;
h$_2$ = 0 or 1 to 5,
h$_4$ = 1 to 5.

Monomers which have not a cation-exchangeable group or a functional group being converted to a cation-exchangeable group and can be copolymerized with said monomer.

CF$_2$ = CF$_2$
CF$_2$ = CF—CF$_3$
CF$_2$ = CF—O(CF$_2$—CF—O)$_h$R$_f$

-continued $$CF_2 = CF-C-R_f'$$
$$\quad\quad\quad\quad\quad \| $$
$$\quad\quad\quad\quad\quad O$$

$R_f = -C_6F_6, -CF_2-CF_2X''$
$X'' = -1$ or $C_1-C_5$ perfluoroalkyl group
$R_f' = C_1-C_5$ perfluoroalkyl group
$i = 0$ or 1 to 5.
$CF_3NO$ $$CF_2 - C = CF_2$$
$$\quad \backslash \quad /$$
$$\quad\;\; CF_2$$

Suitable typical fluorinated monomers include

A group:

$$CF_2 = CF-O-CF_2-CF_2-SO_2F;$$

$$CF_2 = CF-O-CF_2-CF-O-CF_2-CF_2-SO_2F;$$
$$\quad\quad\quad\quad\quad\quad\quad\quad\quad\; |$$
$$\quad\quad\quad\quad\quad\quad\quad\quad\quad\; CF_3$$

$$CF_2 = CF-O-CF_2-CF-O-CF_2-CF-O-CF_2-CF_2-SO_2F;$$
$$\quad\quad\quad\quad\quad\quad\quad\quad\; |\quad\quad\quad\quad\quad\quad |$$
$$\quad\quad\quad\quad\quad\quad\quad\quad\; CF_3\quad\quad\quad\quad\quad CF_3$$

$$CF_2 = CF-CF_2-CF_2-SO_2F;$$

$$CF_2 = CF-O-CF_2-CF-O-CF_2-CF_2-SO_2F$$
$$\quad\quad\quad\quad\quad\quad\quad\quad\quad |$$
$$\quad\quad\quad\quad\quad\quad\quad\quad\quad CF_2$$
$$\quad\quad\quad\quad\quad\quad\quad\quad\quad |$$
$$\quad\quad\quad\quad\quad\quad\quad\quad\quad O-CF_3$$

B group:

$$CF_2 = CF-O-CF_2-CF_2-COF;$$
$$CF_2 = CF-O-CF_2-CF_2-CF_2-COF;$$
$$CF_2 = CF-O-CF_2-CF_2-CF_2-CF_2-COOM_6;$$
$$CF_2 = CF-O-CF_2-CF-O-CF_2-CF_2-COF;$$
$$\quad\quad\quad\quad\quad\quad\quad\quad\quad |$$
$$\quad\quad\quad\quad\quad\quad\quad\quad\quad CF_3$$
$$CF_2 = CF-COOM_e$$

C group:

$$CF_2 = CF-CF_3;$$
$$CF_2 = CF-O-CF_3;$$
$$CF_2 = CF-O-CF_2-CF_3;$$
$$CF_2 = CF_2$$

The monomers in A group are used for introducing sulfonic acid groups. The monomers in B group are used for introducing carboxylic acid groups. The monomers in C group are used for copolymerization with the monomer in A group and/or B group.

The other cation-exchange membranes used in the present invention are prepared by the immersing method.

The followings are typical examples for preparing the cation-exchange membranes by the immersing method.

(1) One or more monomer in B group with or without the monomer in C group is absorbed in the sulfonic acid type cation-exchange membrane and is polymerized and hydrolyzed to introduce carboxylic acid groups.

Suitable monomers in B group include $$CF_2 = CF-O-CF_2-CF_2-CF_2-COF;$$
$$CF_2 = CF-O-CF_2-CF-O-CF_2-CF_2-COF;$$
$$\quad\quad\quad\quad\quad\quad\quad\quad\quad |$$
$$\quad\quad\quad\quad\quad\quad\quad\quad\quad CF_3$$

Suitable monomers in C group include
$CF_2 = CF_2$;
$CF_2 = CF-O-CF_3$.

The cation-exchange capacity of the membrane is usually 0.1 to 4 meq/g preferably 0.5 to 2 meq/g dry resin as carboxylic acid groups; and 0.4 to 1.1 meq/g preferably 0.4 to 0.9 meq/g dry resin as sulfonic acid group.

(2) One or more monomer in A group with or without the monomer in C group is absorbed in the carboxylic acid type cation-exchange membrane and is polymerized and hydroylzed to introduce sulfonic acid groups.

Suitable monomers in A group include $$CF_2 = CF-O-CF_2-CF-O-CF_2-CF_2-SO_2F$$
$$\quad\quad\quad\quad\quad\quad\quad\quad\quad |$$
$$\quad\quad\quad\quad\quad\quad\quad\quad\quad CF_3$$

Suitable monomers in C group include $CF_2 = CF_2$.

The cation-exchange capacity of the membrane is usually 0.1 to 4 meq/g preferably 0.5 to 2 meq/g dry resin as carboxylic acid groups and 0.4 to 1.1 meq/g preferably 0.4 to 0.9 meq/g dry resin as sulfonic acid groups.

These cation-exchange membranes can be reinforced with a reinforcing materials such as glass fiber cloth, polyester fiber cloth, fluorinated polymer fiber cloth for improving characteristics of the membrane. In the preparation of the reinforced membrane, the cloth can be inserted before or after the polymerization of the fluorinated monomers.

In the treatment, the cation-exchangeable groups can be sulfonic acid groups and/or carboxylic acid groups in free and also can be alkali metal salts or ammonium slats thereof.

The water miscible organic solvents used in the treatment of the present invention should swell the membrane treated and have more than 0.1 g/100 g $H_2O$ of a solubility to water and are preferably the organic solvents which rapidly swell the membrane and are easily vaporized to be removed from the membrane.

Suitable water miscible organic solvents include aliphatic monohydric alcohols such as methanol, ethanol, propanol, butanol; ketones such as acetone, methyl ethyl ketone, diethyl ketone; esters such as methyl acetate, ethyl acetate, propyl acetate; ethers such as ethyl ether, propyl ether, tetrahydrofuran, dioxane; and chloroform.

The organic solvents can be used as mixtures thereof. It is also possible to contain the other solvent which swells the membrane but does not affect for improving the characteristics of the membrane such as water.

In the swelling operation, the membrane is dipped in the water miscible organic solvent so as to be swollen. The condition is not limited and can be the temperature from 0° C. to the boiling point of the solvent.

In the solvent removing operation, the membrane impregnating the organic solvent can be removed by heating or drying under a gas flow of air, nitrogen gas or other inert gas, drying in vacuum or other conventional processes.

It is preferable to remove the organic solvent by evaporating it under heating so as to complete the annealing of the membrane.

It is especially preferable to hold the membrane impregnating the organic solvent between a pair of glass plates with or without wiping out the surface of the membrane and then to evaporate it under heating the swollen membrane so as to complete the annealing of the membrane and to hold the shape of the membrane without deformation.

The heat treatment for removing the organic solvent can be in a range of higher than the room temperature to 200° C. and preferably 60° to 150° C. because when it is too low, it takes a long time for removing the organic solvent whereas when it is too high, the electric resistance of the membrane may be increased.

In the heat treatment, the membrane swollen with the water miscible organic solvent is preferably held between a pair of plates such as glass plate, polytetrafluoroethylene plates, stainless steel plates, though it can be treated in hot air flow.

In the present invention, it is the fundamental consideration to swell the cation-exchange membrane of a fluorinated polymer with the water miscible organic solvent. The fluorinated polymers having no functional group are water-repellent and oil-repellent. The bases of the membrane may have the tendency of water-repellent and oil-repellent. However, the cation-exchangeable groups are bonded in the fluorinated polymer and have high affinity to water so as to bond water molecules around the cation-exchangeable groups. The swelling of the membrane of the fluorinated polymer is caused by the effect of the cation-exchangeable groups.

After swelling the membrane, the water miscible organic solvent is preferably removed by evaporating the organic solvent. The cation-exchangeable groups of the membrane are highly affected by the evaporation of the water miscible organic solvent so as to reduce the permeability of hydroxyl group ions.

The present invention will be further illustrated by certain examples.

EXAMPLE 1

A cation-exchange membrane which is made of perfluorosulfonic acid polymer having an average molecular weight of about 1100 per one equivalent of sulfonic acid group in non-crosslinking structure (Trade name Nafion membrane 110 manufactured by Du Pont) was dipped into ethanol at the room temperature for one day to swell it.

The membrane was held between a pair of plates and ethanol in the membrane was removed under a reduced pressure.

The swelling degree was 47%.

The cation transport number of the treated membrane was measured by the Hittorf method in 1N aqueous solution of sodium hydroxide to give 92%.

The electric resistance of the treated membrane was measured by the AC bridge method at 100 c/s in 2% aqueous solution of sodium hydroxide at 25° C. to give 2.5 $\Omega cm^2$.

On the other hand, the cation transport number and the electric resistance of the non-treated membrane were measured by the same methods to give 80% and 2.4 $\Omega cm^2$, respectively.

REFERENCE 1

Styrene-divinyl benzene strong acidic type cation-exchange resin (Trade name Amberlite IR120B manufactured by Rhom & Hass) was pulverized to be fine powder (about 300 mesh).

The cation-exchange resin powder was mixed with polyvinyl fluoride powder at a ratio of 7:3 by weight and they were kneaded with a small amount of dimethylformamide and the mixture was pressed under heating to form a non-homogeneous cation-exchange membrane.

In accordance with the methods of Example 1, the electric resistance and the cation transport number of the membrane were measured to give 5.2 $\Omega cm^2$ and 78%, respectively.

Then the non-homogeneous cation-exchange membrane was dipped into methanol for one night to swell it. The swelling degree was 1.2%.

The membrane was held between a pair of plate and methanol was removed under a reduced pressure.

In accordance with the method of Example 1, the electric resistance and the cation transport number of the treated membrane were measured to give 5.0 $\Omega cm^2$ and 77%, respectively.

EXAMPLE 2

The cation-exchange membrane of Example 1 was dipped into acetone for one day to swell it. The swelling degree was 28%. The membrane was held between a pair of plate and acetone was removed under reduced pressure.

In accordance with the methods of Example 1, the electric resistance of the treated membrane were the cation transport number and measured to give 88%, and 2.4 $\Omega cm^2$, respectively.

EXAMPLE 3

The cation-exchange membrane of Example 1 was dipped into methanol at 60° C. for 2 hours.

The swelling degree was 42%. The membrane was held between a pair of plates and methanol was removed under a reduced pressure.

In accordance with the methods of Example 1, the cation transport number and the electric resistance of the treated membrane were measured to give 93% and 2.5 $\Omega\ cm^2$, respectively.

REFERENCE 2

The cation-exchange membrane of Example 1 was dipped into benzene for 7 days. The swelling degree was 0.94%. The membrane was held between a pair of plates and benzene was removed under a reduced pressure.

In accordance with the methods of Example 1, the cation transport number and the electric resistance of the treated membrane were measured to give 80%, and 2.4 Ω cm², respectively. No effect of the treatment was found.

REFERENCE 3

The cation-exchange membrane of Example 1 was dried under a reduced pressure to remove most of water in the membrane.

In accordance with the methods of Example 1, the cation transport number and the electric resistance of the membrane were measured to give 80% and 2.5 Ω cm², respectively.

EXAMPLES 4 TO 10: AND REFERENCES 4 AND 5

Each of the cation-exchange membrane of Example 1 was dipped into each of the organic solvents for one day to swell it.

Each membrane was held between a pair of plates and each solvent was removed.

In accordance with the method of Example 1, the cation transport number and the elctric resistance of each treated membrane were measured.

The results are shown in Table 1.

Table 1

| Exp. | Solvent | Solubility of solvent to water in 100 parts of H₂O | Swelling degree dipping for one day (%)* | Electric resistance of membrane (Ω cm²)** | Cation transport number (%)*** |
|---|---|---|---|---|---|
| 4 | ethanol | ∞ | 45.7 | 2.5 | 92 |
| 5 | n-propanol | ∞ | 41.1 | 2.7 | 90 |
| 6 | n-butanol | 9.1 | 47 | 2.5 | 88 |
| 7 | acetone | ∞ | 27.4 | 3.0 | 83 |
| 8 | ethyl acetate | 10 | 12.1 | 2.5 | 88 |
| 9 | tetrahydrofuran | ∞ | 22.9 | 2.5 | 94 |
| 10 | chloroform | 0.5 | 7.7 | 2.5 | 94 |
| Ref. | | | | | |
| 4 | carbon tetrachloride | 0.05 | 2.0 | 2.8 | 80 |
| 5 | monochlorobenzene | 0 | 2.6 | 2.5 | 80 |
| Cont. | none | — | — | 2.4 | 80 |

Notes:
*[(W − W₀)/W₀] × 100
W: weight of wet membrane
W₀: weight of dry membrane
**measured in 2% NaOH aq. solution at 25° C.
***Cation transport number by the Hittorf method in 1N-NaOH.

EXAMPLE 11

The perfluorosulfonic acid type cation-exchange membrane of Example 1 was dipped into an aqueous solution of sodium hydroxide in equilibrium to convert sulfonic acid groups in the membrane to sodium salt.

The membrane was dried and was dipped into ethanol for one day to swell it. The swelling degree was 45%. Then, it was dried under a reduced pressure to remove ethanol from the membrane. The membrane was held between a pair of plates and ethanol was removed under a reduced pressure.

In accordance with the methods of Example 1, the cationic transport number and the electric resistance of the treated membrane were measured to give 95% and 2.7 Ω cm², respectively.

It was found that the characteristics of the membrane was further improved in comparison with the membrane treated without converting the sulfonic acid groups to the sodium salts.

EXAMPLE 12

A perfluoroether sulfonic acid type cation exchange membrane which was reinforced with a polytetrafluoroethylene cloth and rayon cloth (Nafion membrane 390 manufactured by Du Pont Co.) was dipped into methanol at the room temperature for one day. The swelling degree was 8%.

The membrane was held between a pair of plates and methanol was removed under a reduced pressure.

An electrolytic cell having 100 cm² of effective area was prepared by using the treated membrane as the diaphragm to arrange an anode, an anode compartment, a diaphragm, a cathode compartment and a cathode in order.

An electrolysis of an aqueous solution of sodium chloride was carried out by feeding a saturated aqueous solution of sodium chloride to the anode compartment and feeding the current at 20 A/dm² of current density.

During the electrolysis, water was continuously fed to the anode compartment so as to maintain 20% of the concentration of sodium hydroxide.

The current efficiency to the resulting sodium hydroxide was 93%.

The current efficiency in the same conditions of the electrolysis in the same electrolytic cell except using the non-treated membrane was measured to give 87%.

EXAMPLE 13

The cation-exchange membrane of Example 12 was used without the swelling treatment and the electrolysis was continued under feeding the current for 1000 hours. The current efficiency was decreased to 80%.

The membrane was taken out from the electrolytic cell and was dipped in methanol for one day at the room temperature. The swelling degree was 8.2%.

The membrane was held between a pair of plates and ethanol was removed under a reduced pressure.

The membrane was fitted in the electrolytic cell and the electrolysis was carried out in the same condition. The current efficiency was increased to 97% and was not changed for 100 hours.

EXAMPLE 14

Perfluoro compound having the formula

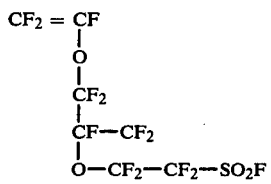

and tetrafluoroethylene were copolymerized by the conventional process and the copolymer was press-molded and was hydrolyzed to form a membrane which was a cation-exchange membrane having sulfonic acid groups which has 0.91 meq/g of a cation exchange capacity (in dry).

The cation-exchange membrane was dipped into ethanol at the room temperature for 24 hours.

After the dipping operation, the surface of the membrane was wiped out and the membrane was held between a pair of glass plates and was heated at 80° C. for 20 hours to obtain the treated membrane.

The results are shown in Table 2.

Table 2

| Membrane | Electric resistance ($\Omega$ cm$^2$) | Cation transport number (%) |
|---|---|---|
| no-treated | 2.4 | 80 |
| treated | 2.9 | 95 |

REFERENCE 6

The cation-exchange membrane of Example 14 was held between a pair of glass plates without dipping into ethanol and was heated at 80° C. for 20 hours.

The cation transport number and the electric resistance of the cation-exchange membrane were measured to give 82% and 2.7 $\Omega$ cm$^2$, respectively.

REFERENCE 7

The cation-exchange membrane of Example 14 was dipped into benzene for 40 hours.

After the dipping operation, the surface of the membrane was wiped out and the membrane was held between a pair of glass plates and was heated at 70° C. for 20 hours to obtain the treated membrane.

The cation transport number and electric membrane of the treated cation-exchange membrane were measured to give 81% and 2.7 $\Omega$ cm$^2$, respectively.

EXAMPLE 15

The cation-exchange membrane of Example 14 was dipped into ethanol at 60° C. for 8 hours.

After the dipping operation, the surface of the membrane was wiped out and the membrane was held between a pair of glass plates and was heated at 80° C. for 20 hours to obtain the treated membrane.

The cation transport number and the electric resistance of the treated cation-exchange membrane were measured to give 97% and 3.2 $\Omega$ cm$^2$.

EXAMPLE 16

The cation-exchange membrane of Example 14 was refluxed in ethanol for 8 hours.

After the refluxing treatment, the membrane was treated in accordance with the process of Example 14.

The cation transport number and the electric resistance of the treated cation-exchange membrane were 97% and 3.2 $\Omega$ cm$^2$, respectively.

EXAMPLES 17 to 23

Each of the cation-exchange membrane of Example 14 was dipped in each of solvents and each membrane was heated at 80° C. for 20 hours in accordance with the process of Example 14.

The cation transport number and the electric resistance of the treated cation-exchange membrane were measured.

The results are shown in Table 3 together with the references.

Table 3

| Exp. | Solvent | Temp. for treating with solvent (° C.) | Time for treating with solvent (Hrs.) | Electric resistance ($\Omega$ cm$^2$) | Cation transport number (%) |
|---|---|---|---|---|---|
| 17 | methanol | room temp. | 20 | 3.1 | 95 |
| 18 | methanol | 60° C. | 8 | 3.2 | 96 |
| 19 | n-propanol | room temp. | 20 | 2.9 | 92 |
| 20 | n-butanol | " | 20 | 2.7 | 91 |
| 21 | ethyl acetate | " | 20 | 2.7 | 91 |
| 22 | tetrahydrofuran | " | 20 | 3.1 | 96 |
| 23 | chloroform | " | 20 | 3.0 | 97 |
| Ref. 8 | CCl$_4$ | " | 20 | 2.5 | 83 |
| 9 | monochlorobenzene | " | 20 | 2.5 | 83 |
| | none | — | — | 2.4 | 80 |

EXAMPLE 24

The cation-exchange membrane of Example 14 was dipped into 0.5N-NaOH aq. solution to convert sulfonic acid groups of the membrane to sodium salt.

The membrane was dipped into methanol at the room temperature for 20 hours. After the dipping operation, the surface of the membrane was wiped out and the membrane was held between a pair of glass plates and was heated at 80° C. for 20 hours to obtain the treated membrane.

The cation transport number and the electric resistance of the treated cation-exchange membrane were measured to give 98% and 3.3 $\Omega$ cm$^2$.

EXAMPLE 25

The electrolysis of Example 12 was repeated except using the non-treated cation-exchange membrane of Example 14 as the diaphragm.

The current efficiency to sodium hydroxide was 87% after 300 hours and 80% after 1000 hours.

At the time, the cation-exchange membrane was taken out from the electrolytic cell and was dipped into methanol at the room temperature for 24 hours.

After the dipping operation, the surface of the membrane was wiped out and the membrane was held between a pair of glass plates and was heated at 80° C. for 24 hours.

The treated cation-exchange membrane was fitted in the electrolytic cell and the electrolysis was carried out in the same condition.

The current efficiency was increased to 96% and was not changed for 200 hours.

EXAMPLE 26

Tetrafluoroethylene and a perfluoroacarbonyl fluoride having the formula $$CH_2=CF-O-(CF_2)_3-COF$$

were copolymerized and the copolymer was press-molded to form a membrane and the membrane was hydrolyzed in an aqueous solution of an alkali metal hydroxide to obtain a carboxylic acid type cation exchange membrane (thickness: 0.2 mm; cation-exchange capacity: 1.95 meq/g dry resin).

The membrane was dipped into methanol at the room temperature for 10 minutes. The swelling degree was 17%.

The membrane was taken out and methanol in the membrane was removed by flowing nitrogen gas at the room temperature.

The cation transport number and the electric resistance of the treated membrane were 93% and 3.7 Ω cm², respectively, and those of the non-treated membrane were 87% and 3.6 Ω cm², respectively.

EXAMPLE 27

The carboxylic acid type cation-exchange membrane of Example 26 was dipped in acetone at the room temperature for 30 minutes. The swelling degree of the membrane was 25%. The membrane was taken up and acetone was removed in vacuum.

The cation transport number and the electric resistance of the treated membrane were measured to give 94% and 4.0 Ω cm².

REFERENCE 10

In the process of Example 26, methanol was incompletely removed from the membrane to remain about 5% of methanol.

The cation transport number and the electric resistance of the membrane were measured to give 85% and 3.0 Ω cm², respectively.

EXAMPLE 28

The carboxylic acid type cation-exchange membrane of Example 26 was dipped into methanol at the room temperature for 10 minutes. The membrane was taken out and was held between a pair of glass plates and methanol in the membrane was removed by heating it at 85° C.

The cation transport number and the electric resistance of the treated membrane were measured to give 95% and 3.6 Ω cm².

EXAMPLE 29

Tetrafluoroethylene, a perfluorosulfonic acid fluoride having the formula

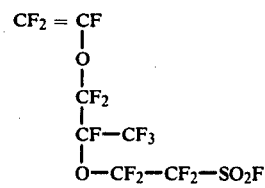

and a perfluorocarboxylic acid fluoride having the formula

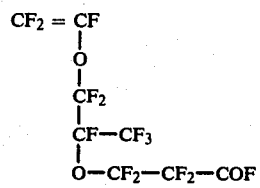

were copolymerized and the copolymer was press-molded to obtain a membrane having 0.24 mm of thickness, and was hydrolyzed to obtain a cation-exchange membrane which has sulfonic acid groups (a cation exchange capacity of 0.78 meq/g dry resin) and carboxylic acid groups (a cation exchange capacity of 0.11 meq/g dry resin).

The cation-exchange membrane was dipped into ethanol at the room temperature for 15 hours. After the dipping operation, the membrane was held between a pair of glass plates and ethanol was removed by heating at 80° C. for 8 hours.

The cation transport number and the electric resistance of the tested membrane were measured to give 97% and 4.5 Ω cm², respectively and those of the non-treated membrane were 92% and 4.2 Ω cm², respectively.

EXAMPLE 30

The cation-exchange membrane of Example 29 was dipped into 1N-NaOH aq. solution to convert it to sodium salts.

The cation-exchange membrane was dipped into methanol at 60° C. for 4 hours. After the dipping operation, the membrane was held between a pair of glass plates and methanol was removed by heating at 80° C. for 15 hours.

The cation transport number and the electric resistance of the treated membrane were measured to give 98% and 4.6 Ω cm², respectively.

EXAMPLE 31

The cation-exchange membrane of Example 29 was dipped into methanol at the room temperature for 24 hours and methanol in the membrane was removed in vacuum.

The cation transport number and the electric resistance of the treated membrane were measured to give 96% and 4.4 Ω cm², respectively.

EXAMPLE 32

In accordance with the process of Example 31 except using tetrahydrofuran instead of methanol, the cation-exchange membrane was treated.

The cation transport number and the electric resistance of the treated membrane were measured to give 97% and 4.4 Ω cm², respectively.

REFERENCE 11

The cation-exchange membrane of Example 29 was dipped into benzene at the room temperature for 24 hours and benzene in the membrane was removed in vacuum.

The cation transport number and the electric resistance of the treated membrane were measured to give 92% and 4.2 Ω cm², respectively.

EXAMPLE 33

Perfluoroacrylic acid was immersed one surface of the cation-exchange membrane (Trade name Nafion membrane 315 manufactured by Du Pont) and it was polymerized to obtain a cation-exchange membrane.

The cation-exchange membrane was dipped into methanol at the room temperature for 10 hours. After the dipping operation, the membrane was held between a pair of glass plates and methanol was removed by heating at 80° C. for 8 hours.

The cation transport number and the electric resistance of the treated membrane were measured to give 98% and 6.2 $\Omega$ cm$^2$, respectively and those of the non-treated membrane were 94% and 6.1 $\Omega$ cm$^2$, respectively.

EXAMPLE 34

An electrolytic cell having 30×30 cm of effective area was prepared by using the cation-exchange membrane of Example 33 as the diaphragm for partitioning an anode compartment and a cathode compartment.

An aqueous solution having 310 g/l of concentration was fed to the anode compartment at a rate of 7418 g per hour and water was fed to the cathode compartment so as to give 20% of the concentration of sodium hydroxide at the outlet of the cathode compartment and the electrolysis was carried out by feeding 180 amp. of current.

The current efficiency to sodium hydroxide and the concentration of sodium chloride in the aqueous solution of sodium hydroxide were as follows:

| Membrane | Current efficiency (%) | Concentration of NaCl (wt. %) |
|---|---|---|
| Treated membrane of Exp. 33 | 97 | <0.01 |
| Non-treated membrane of Exp. 33 | 92 | <0.01 |

What is claimed is:

1. A method of improving characteristics of a cation-exchange membrane, which comprises: swelling a homogeneous cation-exchange membrane formed from at least one fluorinated polymer having cation-exchangeable groups with a water miscible organic solvent; and then evaporating said organic solvent from the swollen membrane, thereby obtaining a solvent free membrane.

2. The method according to claim 1, wherein said organic solvent is removed from the swollen membrane by holding said membrane between a pair of plates and evaporating said organic solvent.

3. The method according to claim 1, wherein said water miscible organic solvent is selected from the group consisting of aliphatic monohydric alcohols, ketones, esters, ethers and chloroform which is miscible to water at least 0.1 g/100 g H$_2$O of solubility and swells the membrane treated.

4. The method according to claim 1, wherein said water miscible organic solvent is methanol, ethanol, propanol or butanol.

5. The method according to claim 1, wherein said water miscible organic solvent is a lower alkyl acetate, tetrahydrofuran, or chloroform.

6. The method according to claim 1, wherein said cation-exchange membrane is fabricated from at least one fluorinated polymer which has cation-exchangeable sulfonic acid groups and/or carboxylic acid groups or salts thereof.

7. The method according to claim 1, wherein said cation-exchange membrane is fabricated of at least one fluorinated polymer which is produced by polymerizing fluorinated monomers which include a fluorinated monomer having a functional group which is a sulfonic acid group or a carboxylic acid group or which is convertible to a sulfonic acid group or a carboxylic acid group.

8. The method according to claim 7, wherein said cation-exchange membrane is prepared by absorbing a fluorinated monomer having the functional group in a fluorinated cation-exchange membrane and polymerizing said fluorinated monomer and hydrolyzing the functional group to the cation-exchangeable group so as to have both of sulfonic acid groups and carboxylic acid groups as the cation-exchangeable groups.

9. A method of improving the characteristics of a cation-exchange membrane, which comprises: swelling a homogeneous cation-exchange membrane formed from at least one fluorinated polymer having cation-exchangeable groups with a water miscible organic solvent; evaporating said organic solvent from the swollen membrane, thereby obtaining a solvent free membrane; and then heat annealing said swollen membrane.

10. The method of claim 9, wherein said membrane is heat annealed at a temperature ranging from greater than room temperature to 200° C.

* * * * *